Nov. 13, 1923.

J. B. BUSHNELL 1,473,900

ELECTRIC LIGHTING SYSTEM

Filed Dec. 1, 1920

WITNESS
H. Sherburne

INVENTOR
John B. Bushnell
BY
White Prost & Evans
his ATTORNEYS

Patented Nov. 13, 1923.

1,473,900

UNITED STATES PATENT OFFICE.

JOHN B. BUSHNELL, OF BERKELEY, CALIFORNIA, ASSIGNOR TO N. R. HARRIS AND M. C. HARRIS, COPARTNERS DOING BUSINESS AS THE FIRM OF HARRIS ELECTRIC COMPANY, OF SAN FRANCISCO, CALIFORNIA.

ELECTRIC-LIGHTING SYSTEM.

Application filed December 1, 1920. Serial No. 427,549.

*To all whom it may concern:*

Be it known that I, JOHN B. BUSHNELL, a citizen of the United States, and a resident of Berkeley, county of Alameda, and State of California, have invented a new and useful Electric-Lighting System, of which the following is a specification.

The invention relates to the electric lighting systems of vehicles, such as automobiles, tractors, trucks, etc., in which the generator of electric current is connected directly to the vehicle driving motor. The speed of rotation of the motor is variable, under operating conditions, through a wide range and, consequently, the speed of rotation of the generator is correspondingly varied. Inductor alternators are widely used for lighting purposes on vehicles and in inductor type machines the generated voltage varies with the angular velocity of the inductor, causing a varying voltage to be imposed on the lamps, which are usually directly connected to the alternator. The alternator is usually constructed to deliver the rated lamp voltage at the average driving speed of the vehicle and when the vehicle travels at a higher speed than the average speed, the voltage impressed on the lamps is in excess of the rated voltage, causing the lamps to burn out rapidly. For instance, one inductor lighting installation embodies six volt lamps and an inductor which delivers six volts at an engine speed of 1800 R. P. M. and nine volts at an engine speed of 3000 R. P. M., and this excess voltage causes very rapid destruction of the lamps.

It is an object of my invention, therefore, to provide an inductor alternator lighting system in which the voltage delivered by the generator is substantially constant during average and high engine speeds.

The invention possesses other advantageous features, some of which, with the foregoing, will be set forth at length in the following description, where I shall outline in full, that form of the invention which I have selected for illustration in the drawings accompanying and forming part of the present specification. In said drawings, I have shown the invention as applied to one type of inductor machine, but it is to be understood that I do not limit myself to the form shown, nor to application to the inductor shown, since the invention, as expressed in the claims, may be embodied in a plurality of forms.

Referring to said drawings.

Figure 1:
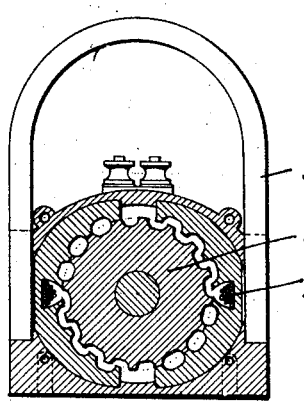
Figure 1 is a cross section of one type of inductor to which my invention is applicable.
Figure 4:
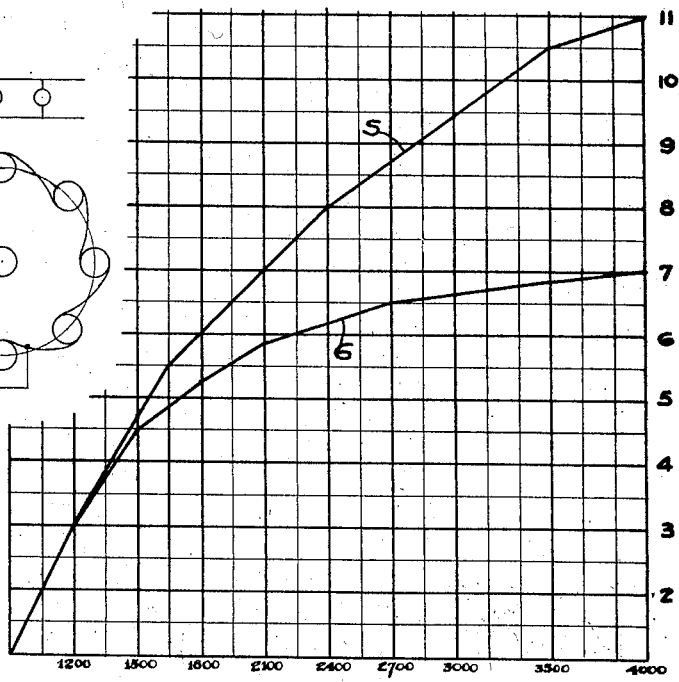
Fig. 4 shows graphically the effect of my invention upon the voltage delivered from an inductor such as shown in Fig. 1.

The inductor shown in Fig. 1 is substantially the same as that shown in United States Letters Patent No. 1,162,726 issued to A. H. Neuland on November 30, 1915, and requires no detailed description herein. Such generator embodies a coil or winding 2 through which the direction of the magnetic flux produced by the permanent magnets 3, is rapidly reversed, generating a voltage in the coil 2 which increases with increased angular velocity of the toothed core 4. The coil 2 is concentrated in one of the slots formed in the toothed pole faces of the permanent magnet 3. With an inductor of this type, of given size and construction having a circuit containing two 6-8 volt 21 candle power lamps connected to the coil, the voltage generated at varying speeds, is shown by the curve S, Fig. 4. It will be noted that the voltage rises rapidly and reaches 6 volts at approximately 1600 R. P. M. and continues to rise to 11 volts at 4000 R. P. M. At all speeds over 1800 R. P. M. the voltage is excessive, to the detriment of the lamps.

In accordance with my invention I construct the inductor or introduce an element into the circuit of the coil so that the voltage rises substantially as quickly up to 5 volts, but does not increase very materially for higher speeds. The curve 6, Fig. 4, indicates the generated voltage at varying speeds of the system of my invention. From such curve, it will be noted that 5.25 volts are generated at 1800 R. P. M. and that 7 volts are generated at 4000 R. P. M.

Figure 2:
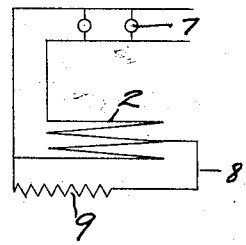
Fig. 2 is a diagrammatic representation of the windings of an inductor embodying my invention.
Figure 3:
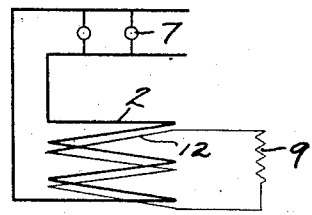
Fig. 3 is a diagrammatic representation of a different arrangement of the system.

In Fig. 2, the lamps 7 are arranged in parallel in a circuit connected to the ends of the coil 2. Connected across a portion of the coil, preferably across approximately one-half of the coil, is a circuit 8 containing a resistance 9.

The permanently closed circuit including resistance 9 causes a circulating current to flow therein, which has such an effect upon the terminal voltage that it cannot rise rapidly as the speed increases. This effect may be due to several causes, such as the effect of the circulating current upon the useful flux.

Instead of connecting the resistance across a portion of the coil, another winding 12 may be wound on the coil and the resistance connected across the winding 12, producing the same result as in the arrangement shown in Fig. 2.

Figure 5:
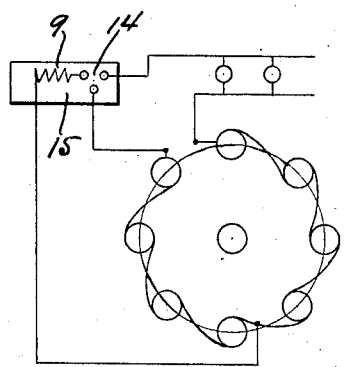
Fig. 5 is a diagrammatic representation of the application of the invention to the magneto of the Ford automobile.

In Fig. 5 I have shown the application of the invention to the magneto of the Ford automobile which is of the inductor type and which supplies current for the headlights. In this arrangement, the circuiting containing the resistance is connected across one-half of the coils of the winding. A three contact switch 14 is provided which is closed by connecting together the three contacts, thus energizing the light circuit and closing the short circuit at the same time, so that the short circuit is not effective when the light circuit is open.

The resistance 9 is preferably enclosed in the switch casing 15, so that the switch casing contains the required elements for incorporating the system in a Ford automobile.

I claim:

1. In an alternating current generator adapted to be driven at varying speeds, a magnetic member, a coil carried by said member, and adapted to be connected at its ends to a load, a relatively rotatable core for varying the magnetism threading the coil at a rate dependent upon the relative speed of rotation, and a resistance closing the circuit of a part of the turns of the coil.

2. In an alternating current generator adapted to be driven at varying speeds, a stationary magnetic member, a coil carried by the member and adapted to be connected to a load, a rotatable core for varying the magnetic flux through the coil, and means for forming a closed circuit inductively associated with the magnetic circuit, said means including a resistance separate from the load and in series in the closed circuit.

3. In an alternating current generator adapted to be driven at varying speeds, a toothed magnetic member, a permanent magnet for magnetizing said member, a concentrated coil carried by the toothed member, and adapted to be connected at its ends to a load, a rotatable toothed core for reversing the magnetism threading the coil, and a resistance closing the circuit of a part of the turns of the coil.

4. An inductor alternator having relatively movable magnetic members and a generating coil carried by one of the members adapted to be connected to a load, characterized by the provision of an energy absorbing member related to the magnetic structure in such a way that it forms a path separate from the load for some of the electrical energy developed by the alternator.

In testimony whereof, I have hereunto set my hand.

JOHN B. BUSHNELL.